United States Patent [19]

Miyake et al.

[11] Patent Number: 4,613,943
[45] Date of Patent: Sep. 23, 1986

[54] OPERATION TEACHING METHOD AND APPARATUS FOR INDUSTRIAL ROBOT

[75] Inventors: Norihisa Miyake, Ibaraki; Akira Tsuchihashi, Nagareyama; Osamu Fujiwara, Funabashi; Yasuhiro Hashimoto, Ibaraki; Yutaka Maruyama, Ashikaga, all of Japan

[73] Assignee: Hitachi, Ltd., Tokyo, Japan

[21] Appl. No.: 599,472

[22] Filed: Apr. 12, 1984

[30] Foreign Application Priority Data

Apr. 13, 1983 [JP] Japan ................... 58-63593

[51] Int. Cl.$^4$ ..................... G06F 15/46; G05B 19/42
[52] U.S. Cl. .................................. 364/513; 318/568; 364/191; 901/3; 901/42
[58] Field of Search ............. 364/513, 191-193, 364/474, 478; 318/568; 901/1-7, 41, 42, 50; 414/730

[56] References Cited

U.S. PATENT DOCUMENTS

| Re. 30,016 | 5/1979 | Hohn | 364/513 |
|---|---|---|---|
| 3,909,600 | 9/1975 | Hohn | 364/513 |
| 3,920,972 | 11/1975 | Corwin, Jr. et al. | 364/513 |
| 4,086,522 | 4/1978 | Engelberger et al. | 364/513 |
| 4,495,588 | 1/1985 | Nio et al. | 364/513 |
| 4,517,653 | 5/1985 | Tsuchihashi et al. | 364/513 |

Primary Examiner—Joseph Ruggiero
Attorney, Agent, or Firm—Antonelli, Terry & Wands

[57] ABSTRACT

An operation teaching method and apparatus for an industrial robot adapted to be successively moved to and set at different positions along an objective structure to conduct a predetermined operation on working objects of the same configuration on the objective structure to which objects the different positions correspond, respectively. The data taught at an initial position is corrected through a coordinate transformation between a coordinate system fixed on a working object and a coordinate system assumed on the robot, and the corrected data are reproduced and used as the operation data for the second and the following working positions.

18 Claims, 7 Drawing Figures

OPERATION TEACHING METHOD AND APPARATUS FOR INDUSTRIAL ROBOT

BACKGROUND OF THE INVENTION

The present invention relates to a method of and apparatus for teaching an operation to an industrial robot and, more particularly, to an operation teaching method and apparatus suitable for industrial robots which are intended to be moved to a plurality of positions and to perform the same task at these positions.

Generally, industrial robots are fixed and perform tasks on works which are disposed within the reaches of the industrial robots. In the case where the works are of the same configuration, it is preferred from the view point of the working efficiency of the robot and the labour saving effect that the content of the operation taught to the robot for one of the works is memorized and reproduced at each time of operation to enable the robot to perform the same task on a plurality of works of the same configuration. This control method is generally referred to as a "teaching and playback control method" and a typical example of this method is disclosed in U.S. Pat. No. 3,920,972.

In recent years, the kinds of industrial robots are so diversified and there is an increasing demand for industrial robots which can perform tasks on the works installed on large structures which are difficult to move or on the works installed inside of box-shaped structures. In order to cope with this demand, it is necessary to take a suitable measure for moving the robot to the position of the work and to fix the same at this position. In the system in which the industrial robot has to be moved to different positions, it is impossible to adopt the above-mentioned teaching and playback control method which is designed for an industrial robot which is intended to perform a task at fixed position. Namely, assuming that the industrial robot first performs the task on a work at a first position and then moves to a second position where it performs the same task on the new work, it is quite difficult to realize in the second position the same positional relationship between the robot and the work as that attained in the first position. It is, therefore, impossible to effect the desired task on the work at the second position by reproducing the content of the operation taught in the first position. Consequently, it is necessary to teach the content of the operation again to the robot after the robot is moved to the second position.

SUMMARY OF THE INVENTION

Accordingly, an object of the invention is to provide an operation teaching method and apparatus for an industrial robot which is improved to remarkably shorten the length of time required for teaching the content of the operation when the robot has been moved to a new position, even when the positional relationship between the robot and the work in the new position differs from that in the previous position of the robot.

Another object of the invention is to provide an operation teaching method and apparatus which can widen the scope or application of the industrial robot to works having the same configuration.

To these ends, according to one aspect of the invention, there is provided an operation teaching method for an industrial robot which is adapted to be successively moved to and set at different positions along an objective structure to conduct a predetermined operation on working objects of the same configuration on the objective structure to which objects said different positions correspond, respectively, the method comprising: teaching, when the industrial robot is set at a first position corresponding to a first working object, positions of base references and a locus of the robot operation assumed on the first working object, and storing such information as coordinate values given in terms of a first robot coordinate system assumed on the robot set in the first position; teaching, when the industrial robot is set at a second position corresponding to a second working object, positions of comparison references assumed on the second working object at positions corresponding to the base reference positions, and storing such information as coordinate values given in terms of a second robot coordinate system assumed on the industrial robot set at the second position; calculating correlation information describing the relationship between the first robot coordinate system and the second robot coordinate system from the coordinate values of the base references in terms of the first robot coordinate system and the coordinate values of the comparison references in terms of the second robot coordinate system; and correcting, by using the aforementioned correlation information describing the relationship between the first robot coordinate system and the second robot coordinate system, the coordinate values representing the locus of the robot operation in terms of the first robot coordinate system to determine coordinate values representing the locus of the robot operation in terms of the second robot coordinate system.

According to another aspect of the invention, there is provided an operation teaching apparatus for an industrial robot adapted to be successively moved to and set at different positions along an objective structure to conduct a predetermined operation on working objects of the same configuration on the objective structure to which objects the different positions correspond, respectively, the apparatus comprising: memory means for storing the content of a robot operation on the working objects taught to the industrial robot; first computing means for calculating correlation between a first robot coordinate system assumed on the industrial robot set at a first position corresponding to a first working object and a second robot coordinate system assumed on the industrial robot set at a second position corresponding to a second working object from coordinate values of base references assumed on the first working object and coordinate values of comparison references assumed on the second working object, said coordinate values of the base references being stored in said memory means in terms of the first robot coordinate system, and said coordinate values of the comparison references being stored in said memory means in terms of the second robot coordinate system; and second computing means for conducting, using the forementioned correlation information between the first and second robot coordinate systems, a correcting computation of coordinate values representing the taught operation of the robot and stored in said memory means in terms of the first robot coordinate system to determine coordinate values representing the taught operation of the robot in terms of the second robot coordinate system.

These and other objects, features and advantages of the invention will become clear from the following

DESCRIPTION OF THE PREFERRED EMBODIMENTS

Preferred embodiments of the invention will be described hereinunder with reference to the accompanying drawings.

Figure 1:
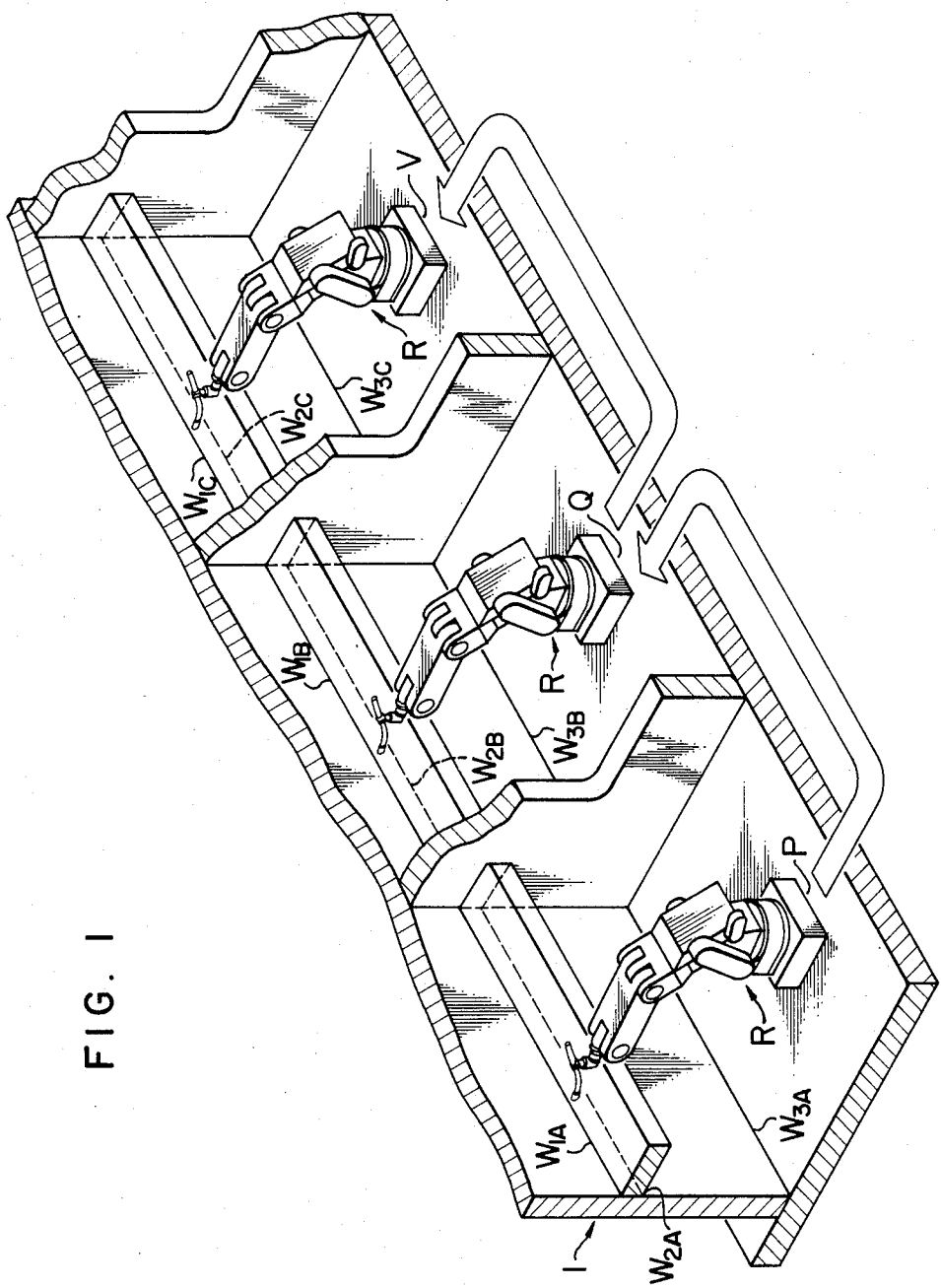
FIG. 1 is a perspective view showing, partly in section, an object which is to be processed by an industrial robot to which the present invention is applied.
Figure 2:
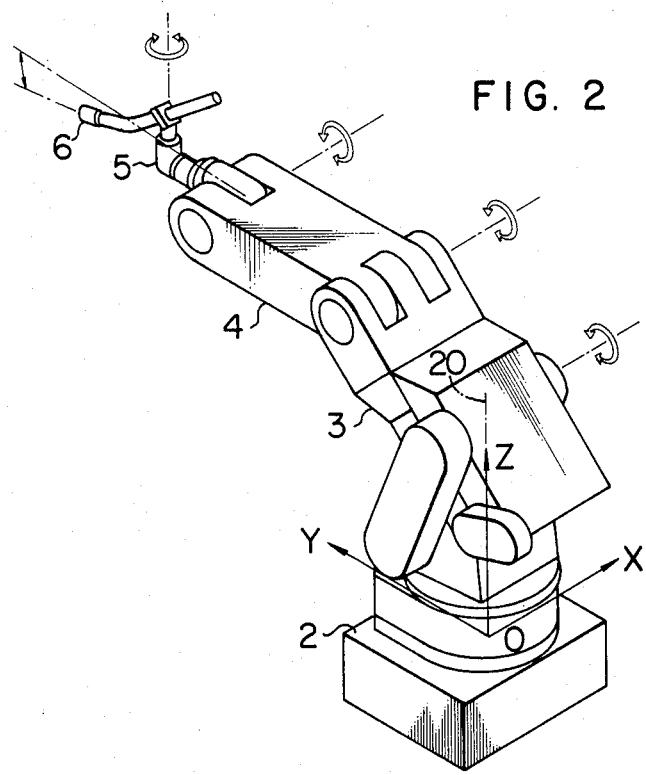
FIG. 2 is a perspective view of an industrial robot to which the present invention is applied.

Referring first to FIG. 1, an industrial robot R is intended for performing tasks on an objective structure 1 which is a box-type structure. More specifically, the objective structure 1 has a plurality of portions to be worked (referred to as "working objects", hereinunder $W_{1A}$ to $W_{1C}$, to $W_{2C}$ and $W_{3A}$ to $W_{3C}$. In order to perform the tasks on these working objects, the robot R is adapted to be moved successively to positions P, Q and V in the vicinity of working objects $W_{1B}$ and $W_{1C}$. An example of the robot R is shown in FIG. 2. Namely, the robot R may be of the type having a turret 2, an upper arm 3 swingably mounted on the turret 2, a fore arm 4 swingably attached to the end of the upper arm 3, a wrist 5 swingably attached to the end of the fore arm 4, and a welding torch 6 provided on the wrist 5.

In operation, the robot R performs the tasks on the objective structure 1 in the following manner. Namely when the robot R takes the position P in the vicinity of the working object $W_{1A}$, the content of the operation to be performed on the working object $W_{1A}$ is taught to the robot R, so that the robot R performs the taught operation on the working object $W_{1A}$. Then, the robot R is moved to the position Q in the vicinity of the working object $W_{1B}$ corresponding to the working object $W_{1A}$, so as to perform the same operation on the working object $W_{1B}$ as that performed previously on the working object $W_{1A}$. In this manner, the robot R performs the expected operations successively on the working objects $W_{1A}$ to $W_{1C}$, $W_{2A}$ to $W_{2C}$ and $W_{3A}$ to $W_{3C}$ on the objective structure 1.

According to the invention, when the robot R is moved to positions different from the first position where the content of the operation is taught to the robot, the content of the operation taught in the first position is amended in accordance with the new positional relationships between the robot R and the working objects $W_{1B}$, $W_{1C}$ so that the robot can perform the expected task through teaching of only a few points, without necessitating reteaching of the entire operation in the new positions.

Figure 3:
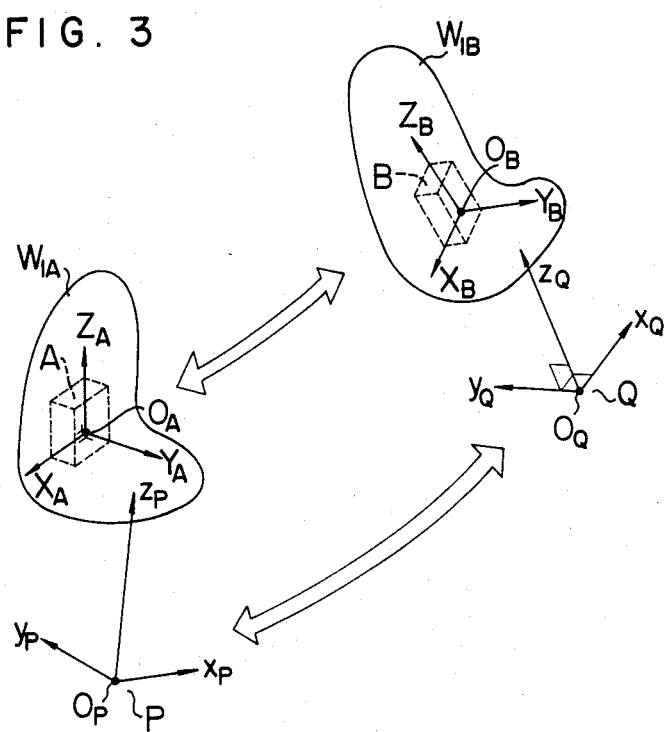
FIG. 3 is an illustration of the principle of operation teaching method in accordance with the invention.

In order to make understood the teaching method in accordance with the invention, the principle of this teaching method will be described hereinunder with specific reference to FIG. 3. A fixed coordinate system $O_A$, $X_A$, $Y_A$ and $Z_A$ is assumed as shown in FIG. 3 on the working object $W_{1A}$ which is to be processed by the robot R installed or set at the position P shown in FIG. 1, while a corresponding coordinate system $o_P$, $x_P$, $y_P$ and $z_P$ is assumed on the robot R. Similarly, a fixed coordinate system $O_B$, $X_B$, $Y_B$ and $Z_B$ is assumed on the working object $W_{1B}$ which is to be processed by the robot R set at the position Q, and a corresponding coordinate system $o_Q$, $x_Q$, $y_Q$, $z_Q$ is assumed on the robot R. These coordinate systems assumed on the robot R correspond to the coordinate system o, x, y, z on the robot R shown in FIG. 2.

The teaching of the content of the operation is made on the robot R in the position P with respect to the working object $W_{1A}$. The point data obtained through the teaching, therefore, is based on the coordinate system $o_P$, $x_P$, $y_P$, $z_P$ on the robot R located at the position P.

In order to move the robot R to the next position Q to enable the robot to perform the same operation on the working object $W_{1B}$ corresponding to the working position $W_{1A}$, it is necessary to express the point data, which has been obtained in the position P, in terms of the coordinate system $o_Q$, $x_Q$, $y_Q$, $z_Q$ assumed on the robot R in the position Q.

As stated before, the content of the operation to be performed by the robot on the working object $W_{1B}$ is identical to that performed by the robot on the working object $W_{1A}$. Therefore, the coordinate values $(X_a, Y_a, Z_a)$ of any desired point A on the working object $W_{1A}$ in terms of the coordinate system $O_A$, $X_A$, $Y_A$, $Z_A$ coincide with the coordinate values $(X_b, Y_b, Z_b)$ of the corresponding point B on the working object $W_{1B}$ in terms of the coordinate system $O_B$, $X_B$, $Y_B$ and $Z_B$.

It is assumed here also that the coordinate values of the point A in terms of the coordinate system $o_P$, $x_P$, $y_P$, $z_P$ assumed on the robot R in the position P are expressed as $(x_p, y_p, z_p)$, while the coordinate values of the point B in terms of the coordinate system $o_Q$, $x_Q$, $y_Q$, $z_Q$ are given as $(x_q, y_q, z_q)$. It will be understood that, if a suitable equation is given for the transformation between the coordinate values $(x_p, y_p, z_p)$ of the point A and those $(x_q, y_q, z_q)$ of the point B, it will become possible to enable the robot to perform the expected operation regardless of the set position of the robot R with respect to the working object $W_{1B}$, by amending the taught data by means of the transforming equation and then reproducing the amended content of the teaching.

An explanation will be made hereinunder as to how the transformation of the coordinate values mentioned above is conducted in a manner explained hereinunder. Namely, the coordinate values of any desired point A shown in FIG. 3 are expressed as $(X_a, Y_a, Z_a)$ in terms of the coordinate system $O_A$, $X_A$, $Y_A$, $Z_A$ and as $(x_p, y_p, z_p)$ in terms of the coordinate system $o_P$, $x_P$, $y_P$, $z_P$. The following relationship exists between these two coordinate systems.

$$\begin{bmatrix} X_a \\ Y_a \\ Z_a \\ 1 \end{bmatrix} = T_{w1} \begin{bmatrix} x_p \\ y_p \\ z_p \\ 1 \end{bmatrix} \tag{1}$$

Where, $T_{w1}$ represents the transformation matrix for the transformation between two coordinate systems.

Similarly, the coordinate values of the point B corresponding to the point A are expressed as $(X_b, Y_b, Z_b)$ in terms of the coordinate system $O_B$, $X_B$, $Y_B$, $Z_B$ and as $(x_q, y_q, z_q)$ in terms of the coordinate system $o_Q$, $x_Q$, $y_Q$, $z_Q$. The following relationship exists between these two coordinate systems.

$$\begin{bmatrix} X_b \\ Y_b \\ Z_b \\ 1 \end{bmatrix} = T_{w2} \begin{bmatrix} x_q \\ y_q \\ z_q \\ 1 \end{bmatrix} \quad (2)$$

where, $T_{w2}$ represents the transformation matrix for the transformation between two coordinate systems.

Since the point A in the coordinate system $O_A$, $X_A$, $Y_A$, $Z_A$ corresponds to the point B in the coordinate system $O_B$, $X_B$, $Y_B$, $Z_B$, the following relationship exists between the coordinate values of these two points A and B.

$$\begin{bmatrix} X_b \\ Y_b \\ Z_b \\ 1 \end{bmatrix} = \begin{bmatrix} 1 & 0 & 0 & 0 \\ 0 & 1 & 0 & 0 \\ 0 & 0 & 1 & 0 \\ 0 & 0 & 0 & 1 \end{bmatrix} \begin{bmatrix} X_a \\ Y_a \\ Z_a \\ 1 \end{bmatrix} \quad (3)$$

Therefore, the following equation (4) is derived from the equations (1), (2) and (3), as an equation which determines the relationship between the coordinate values of the point A in the coordinate system $o_P$, $x_P$, $Y_P$, $z_P$ and the coordinate values of the point B in the coordinate system $o_Q$, $x_Q$, $y_Q$, $z_Q$.

$$\begin{bmatrix} x_q \\ y_q \\ z_q \\ 1 \end{bmatrix} = T_{w2}^{-1} \cdot T_{w1} \begin{bmatrix} x_p \\ y_p \\ z_p \\ 1 \end{bmatrix} \quad (4)$$

where, $T_{w2}^{-1}$ represents the inverse transformation matrix which is inverse to the transformation matrix $T_{w2}$.

The transformation matrices $T_{W1}$ and $T_{W2}$ are expressed by the following equations (5) and (6).

$$T_{w1} = \begin{bmatrix} l_{11} & m_{11} & n_{11} & -x_{10} \\ l_{12} & m_{12} & n_{12} & -y_{10} \\ l_{13} & m_{13} & n_{13} & -z_{10} \\ 0 & 0 & 0 & 1 \end{bmatrix} \quad (5)$$

$$T_{w2} = \begin{bmatrix} l_{21} & m_{21} & n_{21} & -x_{20} \\ l_{22} & m_{22} & n_{22} & -y_{20} \\ l_{23} & m_{23} & n_{23} & -z_{20} \\ 0 & 0 & 0 & 1 \end{bmatrix} \quad (6)$$

where ($l_{11}$, $m_{11}$, $n_{11}$), ($l_{12}$, $m_{12}$, $n_{12}$) and ($l_{13}$, $m_{13}$, $n_{13}$) represents the direction cosines of the axes of the coordinate systems $o_P$, $x_P$, $y_P$, $z_P$ on the axes of the coordinate system $O_A$, $X_A$, $Y_A$, $Z_A$ and ($l_{21}$, $m_{21}$, $n_{21}$), ($l_{22}$, $m_{22}$, $n_{22}$) and ($l_{23}$, $m_{23}$, $n_{23}$) represent the direction cosines of the axes of the coordinate system $o_Q$, $x_Q$, $y_Q$, $z_Q$ on the axes of the coordinate system $O_B$, $X_B$, $Y_B$, $Z_B$. A relationship expressed by the following equation (6A) is also established.

$$T_{w2}^{-1} = \begin{bmatrix} l_{21} & l_{22} & l_{23} & l_{21}x_{20}+l_{22}y_{20}+l_{23}z_{20} \\ m_{21} & m_{22} & m_{23} & m_{21}x_{20}+m_{22}y_{20}+m_{23}z_{20} \\ n_{21} & n_{22} & n_{23} & n_{21}x_{20}+n_{22}y_{20}+n_{23}z_{20} \\ 0 & 0 & 0 & 1 \end{bmatrix} \quad (6A)$$

In the equations (5) and (6) above, the coordinate values ($x_{10}$, $y_{10}$, $z_{10}$) represent the position of the origin of the coordinate system $O_A$, $X_A$, $Y_A$, $Z_A$ on the coordinate system $o_P$, $x_P$, $y_P$, $z_P$, while ($x_{20}$, $y_{20}$, $z_{20}$) represents the position of the origin of the coordinate system $O_B$, $X_B$, $Y_B$, $Z_B$ on the coordinate system $o_Q$, $x_Q$, $y_Q$, $z_Q$.

The following relationships (7) are derived from the nature of the direction cosine, in connection with the equations (5) and (6).

$$l_{i1}^2 + m_{i1}^2 + n_{i1}^2 = 1, \; l_{i1}^2 + l_{i2}^2 + l_{i3}^2 = 1 \quad (7)$$

$$l_{i2}^2 + m_{i2}^2 + n_{i2}^2 = 1, \; m_{i1}^2 + m_{i2}^2 + m_{i3}^2 = 1$$

$$l_{i3}^2 + m_{i3}^2 + n_{i3}^2 = 1, \; n_{i1}^2 + n_{i2}^2 + n_{i2}^2 = 1$$

$$l_{i1} \cdot l_{i2} + m_{i1} \cdot m_{i2} + n_{i1} \cdot n_{i2} = 0, \; \sum_{j=1}^{3} l_{ij} \cdot m_{ij} = 0$$

$$l_{i2} \cdot l_{i3} + m_{i2} \cdot m_{i3} + n_{i2} \cdot n_{i3} = 0, \; \sum_{j=1}^{3} m_{ij} \cdot n_{ij} = 0$$

$$l_{i3} \cdot l_{i1} + m_{i3} \cdot m_{i1} + n_{i3} \cdot n_{i1} = 0, \; \sum_{j=1}^{3} n_{ij} \cdot l_{ij} = 0$$

where, i is an integer which is 1 or 2.

As will be understood from the foregoing description, it is possible to effect the transformation of the coordinate values of the point on the coordinate system $O_A$, $X_A$, $Y_A$, $Z_A$ from the expression in terms of the coordinate system $o_P$, $x_P$, $y_P$, $z_P$ into an expression in terms of the coordinate system $o_Q$, $x_Q$, $y_Q$, $z_Q$, provided that the transformation materials $T_{w1}$ and $T_{w2}$ are given.

In order to make the possibility of the above-mentioned transformation understood more clearly, an explanation will be given hereinunder employing another way of stating the expression.

Any desired point A* is assumed on the coordinate system $O_A$, $X_A$, $Y_A$, $Z_A$. Then, a coordinate system $O_A^*$, $X_A^*$, $Y_A^*$, $Z_A^*$ is assumed to have the origin coinciding with the point A*. The transformation matrix between these two coordinate systems is expressed by $T_H$. Similarly, a coordinate system $O_B^*$, $X_B^*$, $Y_B^*$, $Z_B^*$ is assumed on the coordinate system $O_B$, $X_B$, $Y_B$, $Z_B$. The transformation matrix for transformation between these coordinate systems is also expressed by $T_H$. Representing the transformation matrix for transformation from the coordinate system $o_P$, $x_P$, $y_P$, $z_P$ to the coordinate system $O_A^*$, $X_A^*$, $Y_A^*$, $Z_A^*$ by $T_{R1}$, the transformation matrix $T_{w1}$ is given by the following equation (8).

$$T_{w1} = T_{R1} \cdot T_H \quad (8)$$

Similarly, representing the transformation matrix for the transformation from the coordinate system $o_Q$, $x_Q$, $y_Q$, $z_Q$ to the coordinate system $O_B^*$, $X_B^*$, $Y_B^*$, $Z_B^*$ by $T_{R2}$, the transformation matrix $T_{w2}$ is expressed as follows.

$$T_{w2} = T_{R2} \cdot T_H \quad (9)$$

Therefore, $T_{w2}^{-1} \cdot T_{w1}$ appearing in the equation (4) is rewritten as follows.

$$T_{w2}^{-1} \cdot T_{w1} = T_H^{-1} \cdot T_{R2}^{-1} \cdot T_{R1} \cdot T_H \quad (10)$$

$$= T_{R2}^{-1} \cdot T_{R1}$$

The equation (10) above suggests that any coordinate system can be assumed on the working object. Namely, it is possible to transform the expression in terms of the coordinate system $o_P$, $x_P$, $y_P$, $z_P$ assumed on the robot R in the position P to the expression in terms of the coordinate system $o_Q$, $x_Q$, $y_Q$, $z_Q$ assumed on the robot R in the position Q, by a process which includes the steps of assuming any desired coordinate system $O_A^*$, $X_A^*$, $Y_A^*$, $Z_A^*$ on the working object $W_{1A}$, determining the transformation matrix $T_{R1}$ for transformation between the coordinate system $O_A^*$, $X_A^*$, $Y_A^*$, $Z_A^*$ and the aforementioned coordinate system $o_P$, $x_P$, $y_P$, $z_P$, assuming a coordinate system $O_B^*$, $X_B^*$, $Y_B^*$, $Z_B^*$ corresponding to the coordinate system $O_A$, $X_A$, $Y_A$, $Z_A$ on another working object $W_{1B}$, and determining the transformation matrix $T_{R2}$ for the transformation between this coordinate system $O_B^*$, $X_B^*$, $Y_B^*$, $Z_B^*$ and the aforementioned coordinate system $o_Q$, $x_Q$, $y_Q$, $z_Q$.

Figure 4:
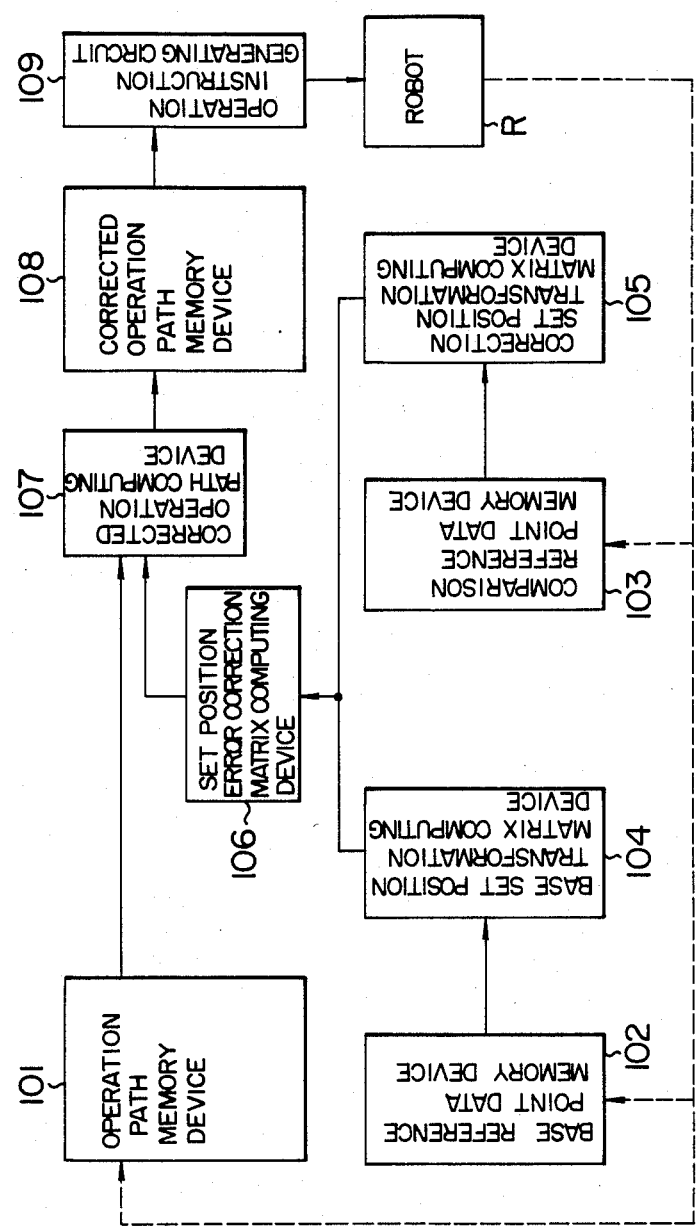
FIG. 4 is a block diagram of an embodiment of operation teaching apparatus of the invention.

An embodiment of the operation teaching apparatus of the invention, making use of the principle explained hereinbefore, will be described hereinunder with specific reference to FIG. 4.

A reference numeral 101 designates an operation path memory device which is adapted to store base working data concerning the path or locus of operation of the robot R set at a base set position such as the position P shown in FIG. 3. This basic working data is given in the form of numerical data which in turn is determined by a computer or the like means from the operation taught to the robot R or the design data. A reference numeral 102 designates a base reference point data memory device adapted to store base reference point data which determines the positional relationship between the working object and the robot R in the prescribed base set position. The base reference point data is inputted through, for example, teaching of the operation. The number of base reference point data can be increased or decreased in accordance with the content of correction required to compensate for the positioning error of the robot which will be described later. The base reference point data is obtained, for example, in relation to the point A shown in FIG. 3. A comparison reference point data memory device 103 is adapted to store comparison reference point data which determines the positional relationship between the working object and the robot R when the robot R is set at each of the other positions (referred to as "correction set position"). This comparison reference point data is obtained in relation to, for example, the point B shown in FIG. 3. A reference numeral 104 designates a device for computing the transformation matrix $T_{w1}$ at the base set position in accordance with the equation (1) from the base reference point data delivered by the device 102. A reference numeral 105 designates a device for computing the transformation matrix $T_{w2}$ at the correction set position in accordance with the equation (2) from the comparison reference point data delivered by the device. A reference numeral 106 designates a device for computing the transformation matrix $T_{w2}^{-1} \cdot T_{w1}$ for the correction of set position error in accordance with the equation (4) mentioned before from the results of computations performed by the devices 104, 105. A reference numeral 107 designates a device for correcting the operation path of the robot R delivered by the device 101, by making use of the set position error correction transformation matrix $T_{w2}^{-1} \cdot T_{w1}$ delivered by the device 106. The corrected operation path data provided by this computing device 107 represents the operation path data required for the robot R in the correction set position. This data is stored in a memory device 108 and is successively forwarded to the operation instruction generating circuit 109 of the robot. The operation instruction generating circuit 109 drives the robot R in accordance with the aforementioned data to effect the operation on the working object at the correction set position.

The computing devices 104 to 106 perform respective computing operations only once at each time the robot R is moved from one to the next position. On the other hand, the computing device 107 effects the correction computation for all points on the operation path. Therefore, if the operation speed of the computing device 1–7 is sufficiently high as compared with the operation speed of the robot R, it is possible to omit the memory device 108 because the computation performed by the computing device 107 can be made in real time during the operation of the robot R.

Figure 5:
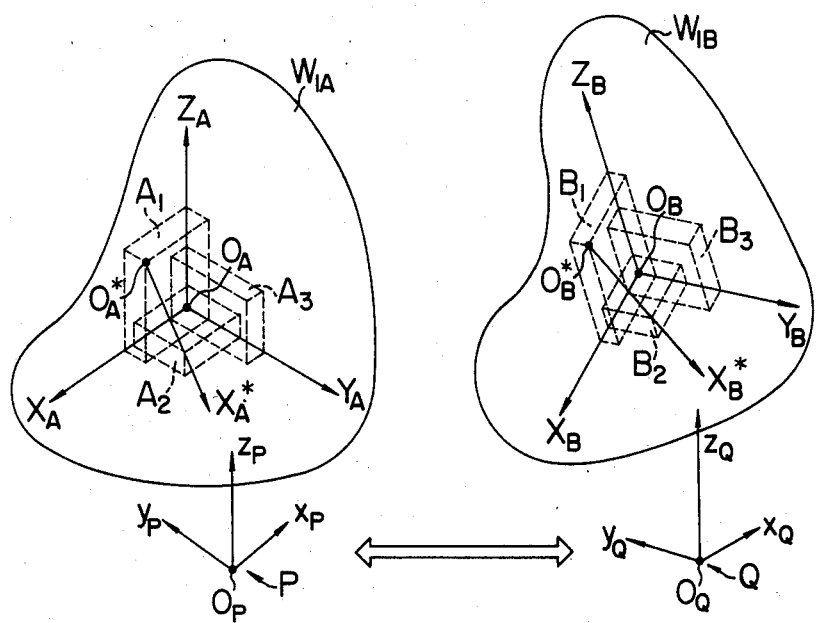
FIGS. 5 to 7 are illustrations of the principle of different embodiments of operation teaching method in accordance with the invention.

An embodiment of the operation teaching method in accordance with the invention will be explained hereinunder with reference to FIG. 5. In FIG. 5, the same reference numerals are used to denote the same parts or members as those used in FIG. 3. Referring to FIG. 5, reference points $A_1$, $A_2$ and $A_3$ are assumed on any desired positions on the working objects $W_{1A}$ of the objective structure 1 for the robot R set at the position P. These reference points $A_1$, $A_2$, $A_3$ will be referred to as "base reference points", hereinunder. On the other hand, reference points $B_1$, $B_2$, $B_3$ are assumed at any desired position on the working object $W_{1B}$ of the objective structure 1 for the robot R set at the position Q. These reference points $B_1$, $B_2$, $B_3$ will be referred to as "comparison reference points", hereinunder. The coordinate values of the comparison reference points $B_1$, $B_2$, $B_3$ on the coordinate system $O_B$, $X_B$, $Y_B$ and $Z_B$ coincide with the coordinate values of the base reference points $A_1$, $A_2$, $A_3$ on the coordinate system $O_A$, $X_A$, $Y_A$ and $Z_A$.

In operation, at first the robot R is set at the position P adjacent to the working object $W_{1A}$. The positions of the three base reference points $A_1$, $A_2$, $A_3$ on the working object $W_{1A}$ of the objective structure 1, as well as the path of the working operation along the working object $W_{1A}$ are taught by the robot R. The data concerning the base reference points $A_1$, $A_2$, $A_3$ are stored in the base reference point data memory device 102 shown in FIG. 4. On the other hand, the taught data concerning the operation path along the working object $W_{1A}$ is stored in the operation path memory device 101. Although in this embodiment the base reference points $A_1$, $A_2$, $A_3$ are assumed at any desired positions on the working object $W_{1A}$, this is not exclusive and they may be set on the taught working operation path. In this case, needless to say, the comparison reference points $B_1$, $B_2$, $B_3$ also are assumed on the working operation path. The computing device 104 performs the following computation in accordance with the base reference point data derived from the memory device 102. Namely, the coordinate values of the base reference point $A_1$, $A_2$, $A_3$ on the coordinate system $o_P$, $x_P$, $y_P$, $z_P$ assumed on the robot R are expressed as follows:

$$\left. \begin{array}{l} A_1 = (x_{p1}, y_{p1}, z_{p1}) \\ A_2 = (x_{p2}, y_{p2}, z_{p2}) \\ A_3 = (x_{p3}, y_{p3}, z_{p3}) \end{array} \right\} \quad (11)$$

On the other hand, the coordinate values of the base reference points $A_1$, $A_2$, $A_3$ on the coordinate system $O_A^*$, $X_A^*$, $Y_A^*$, $Z_A^*$ assumed on the working object $W_{1A}$ are expressed as follows.

$$A_1 = (X_{A1}, Y_{A1}, Z_{A1}) \\ A_2 = (X_{A2}, Y_{A2}, Z_{A2}) \\ A_3 = (X_{A3}, Y_{A3}, Z_{A3})$$  (12)

The coordinate values shown in the equations (11) and (12) above are expressed as follows, using the equation (1) and (5) mentioned before.

$$X_{Ai} = l_{11} \cdot x_{pi} + m_{11} \cdot y_{pi} + n_{11} \cdot z_{pi} - x_{10} \\ Y_{Ai} = l_{12} \cdot x_{pi} + m_{12} \cdot y_{pi} + n_{12} \cdot z_{pi} - y_{10} \\ Z_{Ai} = l_{13} \cdot y_{pi} + m_{13} \cdot y_{pi} + n_{13} \cdot z_{pi} - z_{10}$$  (13)

where, i is an integer which is 1, 2 or 3.

There are 21 (twenty-one) unknowns in the equation (13) above: namely, $X_{A1}$, $Y_{A1}$, $Z_{A1}$, $X_{A2}$, $Y_{A2}$, $Z_{A2}$, $X_{A3}$, $Y_{A3}$, $Z_{A3}$, $l_1$, $l_2$, $l_3$, $m_1$, $m_2$, $m_3$, $n_1$, $n_2$, $n_3$, $x_{10}$, $y_{10}$ and $z_{10}$. Among these 21 unknowns, the following 15 unknowns are independent in view of $X_{A1}$, $Y_{A1}$, $Z_{A1}$, $X_{A2}$, $Y_{A2}$, $Z_{A2}$, $X_{A3}$, $Y_{A3}$, $Z_{A3}$, $l_1$, $l_2$, $m_1$, $x_{10}$, $y_{10}$ and $z_{10}$.

The number of the unknowns can be reduced to 9 (nine) by adopting the following conditions in the coordinate values of the base reference points $A_1$, $A_2$, $A_3$ on the coordinate system $O_A$, $X_A$, $Y_A$, $Z_A$ as given by the equation (2).

$$X_{A1} = Y_{A1} = Z_A = 0$$

$$Y_{A2} = Z_{A2} = 0$$

$$Z_{A3} = 0$$

Thus, the equation (13) above includes 9 (nine) equations. Since these equations are independent of each other, they are soluable by solving simultaneous equations. That is, the transformation matrix $T_{w1}$ is obtainable.

Then, the robot R is moved to and set at the position Q shown in FIG. 5, and the aforementioned comparison reference points $B_1$, $B_2$, $B_3$ are taught to the robot. The data thus taught is stored in the memory device 103 shown in FIG. 3. The computing device 105 then solves the simultaneous equations using the data concerning the comparison reference points $B_1$, $B_2$, $B_3$ in the same manner as described before, thereby to obtain the transformation matrix $T_{w2}$. Then, using this transformation matrix $T_{w2}$ and the transformation matrix $T_{w1}$ from the computing device 104, the computing device 106 shown in FIG. 3 computes the value of the transformation matrix $T_{w2}^{-1} \cdot T_{w1}$. Then, using the transformation matrix $T_{w2}^{-1} \cdot T_{w1}$. Then, using the path for the robot R in the position P derived from the memory device 101 shown in FIG. 3, the computing device 107 performs a correction computation to determine the corrected operation path for the robot in the position Q. In accordance with the information concerning the corrected operation path, the robot R performs the operation on the desired portion of the working object corresponding to the robot position Q.

From the foregoing description, it will be understood that, in the operation at the second and other succeeding positions, it is not necessary to teach the working operation path to the robot. Namely, the robot can perform the operation on the working object of the same shape as that in the position P only by being taught the comparison reference points $B_1$, $B_2$ and $B_3$.

Figure 6:
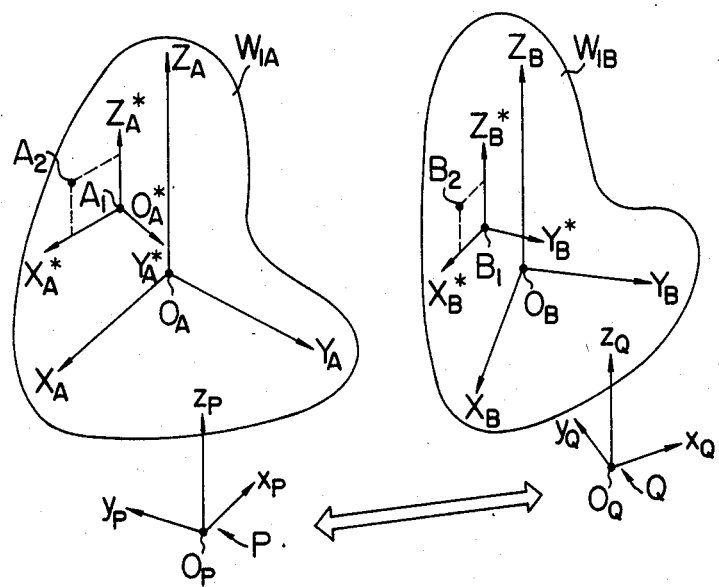

A second embodiment of the operation teaching method of the invention will be described hereinunder with reference to FIG. 6.

In most cases, the robot to which the invention is applied is situated on a horizontal plane. Even if this requirement is not met, the robot generally takes constant positions relative to a plurality of working objects of the same configuration. In the case where the robot is intended for welding in particular, the quality of the work is largely affected by the welding posture. It is, therefore, possible to impose predetermined conditions for the postures of the working object and the working posture of the robot. In the case of the robot R shown in FIG. 2, the shaft 20 of the turret 2 is kept in a constant posture even when the robot R is moved to and set at different positions. Referring to FIG. 6, base reference points $A_1$ and $A_2$ are assumed on the working object $W_{1A}$ for the robot R set at the position P. These base reference points $A_1$ and $A_2$ may be selected such that the straight line interconnecting these points is not parallel to the turret shaft 20 of the robot R. On the other hand, the comparison reference points $B_1$ and $B_2$ are assumed on the working object $W_{1B}$ for the robot R set at the position Q, so as to correspond to the points $A_1$ and $A_2$. When the robot is moved from the position P to the position Q, the working operation path of the robot taught at the position P is corrected using the base reference points $A_1$ and $A_2$ and the comparison reference points $B_1$ and $B_2$, so that the robot R in the position Q can perform on the working object the same operation as that performed by the robot R in the position P, as will be fully understood from the following description.

Relationships similar to those expressed by the equations (11) and (12) apply to the base reference points $A_1$ and $A_2$. A coordinate system $O_A$, $X_A$, $Y_A$, $Z_A$ is selected such that the origin of this coordinate system coincides with the point $A_1$ and that the axis $z_p$, i.e. the turret shaft 20, is parallel to the $Z_A$ axis, with the point $A_2$ included by the plane defined by the axes $X_A$ and $Z_A$.

Consequently, the following conditions are established.

$$X_{A1} = Y_{A1} = Z_{A1} = 0$$

$$Y_{A2} = 0$$

At the same time, the following conditions are met.

$$l_{13} = m_{13} = n_{11} = n_{12} = 0$$

$$n_{13} = 1$$

In view of the conditions such as $l_{11}^2 + m_{11}^2 = 1$, $l_{11}^2 + l_{12}^2 = 1$ and $n_{11}^2 + m_{12}^2 = 1$; there are 6 (six) unknowns $l_{11}$, $x_{10}$, $y_{10}$, $z_{10}$, $X_{A2}$ and $Z_{A2}$. On condition of $i = 1$ or 2 in equation (13), the number of the equations is 6 (six) so that these unknowns can be determined. It is, therefore, possible to obtain the aforementioned transformation matrix $T_{w1}$.

By moving the robot R to the position Q and teaching it the comparison reference points $B_1$, $B_2$ corresponding to the base reference points $A_1$, $A_2$, it is possible to obtain the transformation matrix $T_{W2}$ between the coordinate system assumed on the robot R and the coordinate system defining the points $B_1$, $B_2$. Using this transformation matrix $T_{W2}$ together with the aforementioned transformation matrix $T_{W1}$, it is possible to obtain the transformation matrix $T_{W2}^{-1} \cdot T_{W1}$ for correcting the operation path of the robot R in the position Q. According to this second embodiment, it is possible to reduce the number of the reference points as compared with the first embodiment.

A third embodiment of the operation teaching method of the invention will be described hereinunder.

This third embodiment is a more simplified form of the second embodiment. Namely, if two out of three of the axes of the coordinate system on the robot R are parallel to two out of the three axes of the coordinate system assumed on the working object, it is possible to make the transformation by a translational movement of one of the coordinate systems. This can be achieved by using only one base reference point on the working object for the robot set at one position and a corresponding comparison reference point on the other working object at the position corresponding to the base reference point. Since this principle will be clear from the foregoing description, no further detailed explanation will be needed for this third embodiment.

A fourth embodiment of the operation teaching method of the invention will be described hereinunder.

Figure 7:
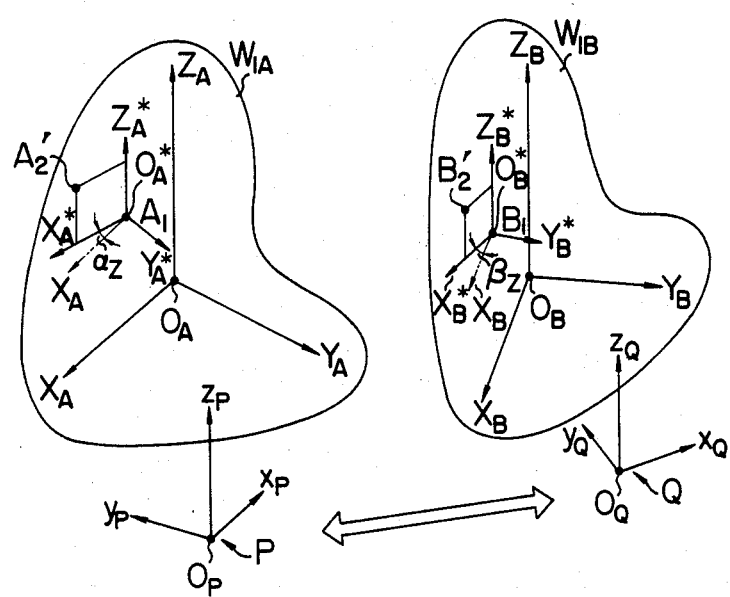

In teaching the robot the operation using the base reference points and the comparison reference points, it is essential that the robot be located precisely in relation to these reference points. Namely, the precision of correction of the operation path of the robot is seriously affected by the error in the teaching in relation to the reference points. In order to diminish this error, it is effective to maximize the distance between the reference points to be taught. It is also effective to employ a statistical processing by increasing the number of the reference points to be taught. Another effective way for diminishing the error is to limit the precision required at the point to be taught only to a specific direction component. Namely, as compared with the indexing of the robot hand end in a three-dimensional space, it is easier to locate the same on a predetermined line (regardless of the position of the direction along the line) and it is still easier to locate the same on a predetermined plane. The fourth embodiment of the invention is based upon this idea, as will be understood from the following description taken in conjunction with specific reference to FIG. 7. In this fourth embodiment, one reference point and one reference plane are used in place of the two reference points employed by the embodiment shown in FIG. 6. More specifically, in this embodiment, although the base reference point $A_1$ and the comparison reference point $B_1$ are given as in the embodiment shown in FIG. 6, the plane defined by the $X_A$ axis and $Z_A$ axis in the coordinate system $O_A$, $X_A$, $Y_A$, $Z_A$ and the plane defined by the $X_B$ axis and $Z_B$ axis in the coordinate system $O_B$, $X_B$, $Y_B$, $Z_B$ are given, respectively, in place of the base reference point $A_2$ and the comparison reference point $B_2$ of the embodiment shown in FIG. 6.

Representing the points to be taught on these planes by $A_2'$ and $B_2'$, respectively, the coordinate values of the point $A_2'$ on the coordinate system $O_B$, $X_B$, $Y_B$, $Z_B$ are expressed as follows, respectively.

$$A_2' = (k_x, 0, \alpha_z)$$

$$B_2' = (h_x, 0, \beta_z)$$

where $k_x$, $h_x$, $\alpha_z$ and $\beta_z$ are any desired values which can satisfy the conditions of $k_x = 0$ and $h_x = 0$.

In this case, since the conditions of $l_{i3} = m_{i3} = n_{i1} = n_{i2} = 0$ and $n_{i3} = 1$ are met, assuming i as being 1 or 2, the transformation matrix $T_{wi}$ is given by the following equation (14).

$$T_{wi} = \begin{bmatrix} l_{i1} & m_{i1} & 0 & -x_{i0} \\ l_{i2} & m_{i2} & 0 & -y_{i0} \\ 0 & 0 & 1 & -z_{i0} \\ 0 & 0 & 0 & 1 \end{bmatrix} \quad (14)$$

Since the conditions $l_{i1}^2 + m_{i1}^2 = l_{i2}^2 + m_{i2}^2 = 1$ and $l_{i1}^2 + l_{i2}^2 = m_{i1}^2 + m_{i2}^2 = 1$ are met, the number of independent unknowns is 4 (four).

Using the equation (13) mentioned before the coordinate values of the point $A_1$ on the coordinate system $O_A$, $X_A$, $Y_A$, $Z_A$ are expressed as follows.

$$X_{A1} = l_{11} \cdot x_{p1} + m_{11} \cdot y_{p1} - x_{10} = 0 \quad (15.1)$$

$$Y_{A1} = l_{12} \cdot x_{p1} + m_{12} \cdot y_{p1} - y_{10} = 0 \quad (15.2)$$

$$Z_{A1} = z_{p1} - z_{10} = 0 \quad (15.3)$$

On the other hand, the coordinate values of the point $A_2'$ on the coordinate system $O_A^*$, $X_A^*$, $Y_A^*$, $Z_A^*$ can be expressed as follows, using the equation (13).

$$X_{A2'} = l_{11} \cdot x_{p2} + m_{11} \cdot y_{p2} - x_{10} = k_x \quad (15.4)$$

$$Y_{A2'} = l_{12} \cdot x_{p2} + m_{12} \cdot y_{p2} - y_{10} = 0 \quad (15.5)$$

$$Z_{A2'} = z_{p2} - z_{10} = \alpha_x \quad (15.6)$$

Since the equation (15.3) affords a condition of $x_{10} = z_{p1}$, the value of $z_{10}$ in equation (15.6) can be determined regardless of the value of $\alpha_z$.

Equations (15.2) and (15.5) in combination give a condition of $m_{12} (y_{p2} - y_{p1}) = l_{12} (x_{p2} - x_{p1})$. This means that $m_{12}$ and $l_{12}$ are not indenpendent from each other, so that $l_{12}$ and $m_{12}$ and, hence, $l_{11}$ and $m_{11}$ are obtainable. Consequently, $x_{10}$ and $y_{10}$ are determined by the equations (15.1) and (15.2), respectively. Thus, all of the unknowns can be determined regardless of the value of $k_x$ in the equation (15.4).

These facts apply also to the transformation matrix $T_{w2}$. It is, therefore, possible to correct the error of the position of the robot, simply by giving one reference point and one reference plane.

As will be understood from the foregoing description, in giving the reference plane, only one point on such a plane is to be given. Therefore, it is possible to assume a line of intersection between the reference plane and another plane and to assume one point at any desired position on this line of intersection. Namely, the operation teaching method of the invention, in this case, is conducted by using one reference point and one reference line.

In the case of welding, the welding line generally coincides with the juncture between two members. Therefore, by using the welding line itself as the reference line, it is possible to eliminate the step for teaching the reference line. Namely, the number of the teaching steps can be decreased thanks to the elimination of teaching of the reference line.

As an alternative of the method shown in FIG. 5, it is advisable to conduct the teaching method by giving one reference point, one reference line and one reference plane. It will be clear to those skilled in the art from the foregoing description that the elements of the transformation matrix can be determined also in this method.

The concepts of the reference line and reference plane explained hereinbefore are to determine only the necessary ones of the coordinate components of coordinate values for determining the transformation matrix $T_{w1}$, $T_{w2}$, while other coordinate components are selected to take any desired values, thereby to decrease the number of steps in the teaching operation.

Although the invention has been described through specific embodiments applied to a multi-articulated robot R adapted for performing welding, the invention can equally be applied to other types of robots intended for use in other purposes.

In the foregoing description, the teaching of the operation path of the robot is effected while the robot is in the first position. This, however, is not exclusive. Namely, when the operation moving path is determined numerically beforehand in accordance with the design data, it is not necessary to teach the operational moving path to the robot while the latter is set in the first position. In this case, the positions of the reference points, line or plane appear optimumly in accordance with the features of the objective structure, e.g. at the corner of the structure.

In the described embodiment, the teaching operation is made by the operator by locating an end of the robot hand at the aimed reference points, lines or planes. However, it will be clear to those skilled in the art that the teaching can be conducted by detecting the informations for determining the reference points by a visual sensor or a mechanical sensor and automatically computing the reference points using the detected informations.

As has been described, according to the invention, it is possible to effect the correction of the operation path of the robot to eliminate any error which may result from the change in the relative position between the robot and the working objects when the robot is moved to and set at different positions. The invention, however, can equally be applied to the correction of the posture of the tool on the robot hand. For instance, this correction can be conducted in a manner explained hereinunder. Namely, in the case of FIG. 2, the posture of the tool on the robot hand when the robot is in the position P is expressed in terms of angular components (Eulerian angle) with respect to the coordinate system $O_A$, $X_A$, $Y_A$, $Z_A$ or direction cosines of the tool axis on the axes of the coordinate system, and the tool posture is controlled when the robot is situated at the position Q in such a manner that the angular components with respect to the coordinate system $O_B$, $X_B$, $Y_B$, $Z_B$ or the direction cosines coincide with those obtained when the robot is set at the position P. In this case, the transformation of the direction cosines with respect to the coordinate system $O_A$, $X_A$, $Y_A$, $Z_A$ to those with respect to the coordinate system $O_B$, $X_B$, $Y_B$, $Z_B$ can be made by means of the transformation matrices $T_{w1}$, $T_{w2}$. Thus, the invention can be applied effectively to such a case that the robot is moved to and set at a plurality of different positions to effect the same operation on similar working objects located at these positions, where a precise control is required not only for the position of an end of the robot hand but also for the posture of the tool held by the robot hand.

To sum up, the present invention offers the following advantages. Namely, it is possible to remarkably shorten the time required for the teaching of the operation in the new working position, because the working operation path of the robot for the working object in the new working position can be obtained only simply by showing several comparison reference points at the new position.

Furthermore, according to the invention, it is possible to enable the robot to precisely conduct the same operation on a plurality of similar working objects disposed at different positions, so that the application of the robot can be widened advantageously.

What is claimed is:

1. An operation teaching method for an industrial robot adapted to be successively moved to and set at different positions along an objective structure to conduct a predetermined operation on working objects of the same configuration on the objective structure to which objects said different positions correspond, respectively, said method comprising:

teaching, when said industrial robot is set at a first position corresponding to a first working object, positions of base references and a locus of the robot operation assumed on said first working object, and storing such information as coordinate values given in terms of a first robot coordinate system assumed in said robot set in said first position;

teaching, when said industrial robot is set at a second position corresponding to a second working object, positions of comparison reference assumed on said second working object at positions corresponding to said base references, and storing such information as coordinate values given in terms of a second robot coordinate system assumed in said industrial robot set at said second position;

computing, by using the coordinate values of said base references on said first robot coordinate system, correlation information concerning a base relationship between said first robot coordinate system and a workpiece coordinate system which is determined by said base references;

computing, by using the coordinate values of said comparison references on said second robot coordinate system, correlation information concerning a comparison relationship between said second robot coordinate system and said workpiece coordinate system; and correcting, by using said base relationship and comparison relationship information, the coordinate values representing said locus of the robot operation in terms of said first robot coordinate system to determine coordinate values representing said locus of the robot operation in terms of said second robot coordinate system.

2. An operation teaching method for an industrial robot according to claim 1, wherein said correlation information comprises a transformation matrix having a component corresponding to the amount of translational movement of said second robot coordinate system with respect to said first robot coordinate system, and a component corresponding to the direction cosines of said second robot coordinate system with respect to said first robot coordinate system.

3. An operation teaching method for an industrial robot according to claim 2, wherein said base references and said comparison references include at least three different reference informations as reference informations for correcting the positional relationship between said second working object and said industrial robot, respectively.

4. An operation teaching method for an industrial robot according to claim 3, wherein said three reference informations comprise a first point assumed on each working object, a second point on a straight line assumed on each working object and passing said first point but located at a position different from that of said first point, and a third point which is in a plane containing said straight line but not existing on said straight line.

5. An operation teaching method for an industrial robot according to claim 2, wherein said base references and said comparison references include two different reference informations as reference informations for correcting the positional relationship between said second working object and said industrial robot.

6. An operation teaching method for an industrial robot according to claim 5, wherein said two reference informations comprise a first point assumed on each working object, and a second point on a straight line assumed on each working object and passing said first point but located at a position different from that of said first point.

7. An operation teaching method for an industrial robot according to claim 5, wherein said two reference informations comprise a first point assumed on each working object, and a second point on a straight line assumed on each working object and passing said first point but located at a position different from that of said first point.

8. An operation teaching method for an industrial robot according to any one of claims 4, 6 and 7 wherein the correction of positional relationship between said second working object and said robot is performed by correcting a coordinate transformation including a translational movement in a three-dimentional space and a rotational movement around a vertical axis or a horizontal axis.

9. An operation teaching method for an industrial robot according to claim 2, wherein said base references and said comparison references include one reference information as a reference information for correcting the positional relationship between said second working object and said industrial robot, respectively.

10. An operation teaching apparatus for an industrial robot adapted to be successively moved to and set at different positions along an objective structure to conduct a predetermined operation on working objects of the same configuration on said objective structure to which objects said different positions correspond, respectively, said apparatus comprising:

memory means for storing the content of a robot operation on the working objects taught to said industrial robot;

first computing means for obtaining correlation information between coordinate values of base references assumed on a first working object and coordinate values of comparison references assumed on a second working object, said coordinate values of the base references being stored in said memory means in terms of a first robot coordinate system assumed on said industrial robot set at a first position corresponding to said first working object, said coordinate values of the comparison references being stored in said memory means in terms of a second robot coordinate system assumed on said industrial robot in a second position corresponding to said second working object; and second computing means for conducting, using said correlation information, correcting computation of coordinate values representing the taught operation of the robot and stored in said memory means in terms of said first robot coordinate system to determine coordinate values representing said taught operation in terms of said second robot coordinate system.

11. An operation teaching apparatus for an industrial robot according to claim 10, wherein said first computing means includes first means for computing a first transformation matrix which represents correlation information between said first robot coordinate system and a first working object coordinate system assumed on said first working object with respect to said base references; and second means for computing a second transformation matrix which represents correlation information between said second robot coordinate system and a second working object cordinate system assumed on said second working object with respect to said comparison references, and third means for computing, using said first and second transformation matrices, a third transformation matrix for correcting the positional error of said second position with respect to said first position.

12. An operation teaching apparatus for an industrial robot according to claim 11, wherein said second computing means includes means for conducting, using values of said third transformation matrix, a correcting computation of said coordinate values representing the taught operation of the robot and stored in terms of said first robot coordinate system into the coordinate values representing the taught operation and given in terms of said second robot coordinate system.

13. An operation teaching apparatus for an industrial robot according to claim 12, wherein said base references and said comparison references includes three different reference informations as reference informations for correcting the positional relationship between said second working object and said industrial robot, respectively.

14. An operation teaching apparatus for an industrial robot according to claim 13, wherein said three reference informations comprise a first point assumed on each working object, a second point on a straight line assumed on each working object and passing said first point but located at a position different from that of said first point, and a third point which is in a plane containing said straight line but not existing on said straight line.

15. An operation teaching apparatus for an industrial robot according to claim 12, wherein said base references and said comparison references includes two different reference informations as reference informations for correcting the positional relationship between said second working object and said industrial robot.

16. An operation teaching apparatus for an industrial robot according to claim 15, wherein said two reference informations comprise a first point assumed on each working object, and a second point on a straight line assumed on each working object and passing said first point but located at a position different from that of said first point.

17. An operation teaching apparatus for an industrial robot according to claim 15, wherein said two reference informations comprise a reference plane passing through a specific axis of each working object coordinate system parallel to one of the axis of each robot coordinate system, and a reference point assumed on said reference plane.

18. An operation teaching apparatus for an industrial robot according to claim 12, wherein said base references and said comparison references include one reference information as a reference information for correcting the positional relationship between said second working object and said industrial robot.

* * * * *